United States Patent
Rutschmann et al.

(10) Patent No.: US 9,662,967 B2
(45) Date of Patent: May 30, 2017

(54) MOTOR VEHICLE HAVING A SUPERCHARGED INTERNAL COMBUSTION ENGINE WHICH IS ARRANGED AT THE REAR

(71) Applicant: Dr. Ing. h.c. F. Porsche Aktiengesellschaft, Stuttgart (DE)

(72) Inventors: Erwin Rutschmann, Tiefenbronn (DE); Walter Stoppel, Moensheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 16 days.

(21) Appl. No.: 15/018,037

(22) Filed: Feb. 8, 2016

(65) Prior Publication Data
US 2016/0229285 A1 Aug. 11, 2016

(30) Foreign Application Priority Data
Feb. 9, 2015 (DE) .................. 10 2015 101 797

(51) Int. Cl.
| | | |
|---|---|---|
| *B60K 11/08* | (2006.01) | |
| *B60K 13/02* | (2006.01) | |
| *B60K 5/00* | (2006.01) | |
| *F02B 29/04* | (2006.01) | |

(Continued)

(52) U.S. Cl.
CPC .............. *B60K 13/02* (2013.01); *B60K 5/00* (2013.01); *B60K 11/04* (2013.01); *B60K 11/08* (2013.01); *F02B 29/0431* (2013.01); *B60K 2005/006* (2013.01); *B62D 35/007* (2013.01); *Y02T 10/146* (2013.01)

(58) Field of Classification Search
CPC ...... B60K 11/08; B60K 13/02; B62D 25/082; F01P 2060/02; F01B 29/0431
See application file for complete search history.

(56) References Cited

U.S. PATENT DOCUMENTS

| | | | |
|---|---|---|---|
| 4,690,204 A * | 9/1987 | Reichel ................... | F01P 11/10 123/41.62 |
| 5,678,884 A | 10/1997 | Murkett et al. | |

(Continued)

FOREIGN PATENT DOCUMENTS

| | | |
|---|---|---|
| DE | 44 41 592 | 5/1996 |
| DE | 198 06 610 | 8/1999 |

(Continued)

OTHER PUBLICATIONS

German Search Report of Nov. 13, 2015.

*Primary Examiner* — Bryan Evans
(74) *Attorney, Agent, or Firm* — Gerald E. Hespos; Michael J. Porco; Matthew T. Hespos

(57) ABSTRACT

A motor vehicle has a supercharged internal combustion engine arranged at the rear and can be fed cooled combustion air via a charge air cooler (7). The charge air cooler (7) is positioned above the internal combustion engine below a covering hood (4) for the internal combustion engine. The charge air ($B_{EIN}$) is fed via at least one charge air inlet opening in a charge air inlet shaft (8) that adjoins the covering hood (4) and is discharged via at least one charge air outlet shaft ($B_{AUS}$) that is connected to outlet openings (13, 14) in the region of a license plate recess (9) of the motor vehicle.

15 Claims, 1 Drawing Sheet

(51) Int. Cl.
*B60K 11/04* (2006.01)
*B62D 35/00* (2006.01)

(56) References Cited

U.S. PATENT DOCUMENTS

| | | | |
|---|---|---|---|
| 2013/0062132 A1* | 3/2013 | Wolf | B62D 35/007 180/68.1 |
| 2013/0168167 A1* | 7/2013 | Matsumoto | B60K 1/04 180/65.31 |
| 2014/0110973 A1 | 4/2014 | Danev | |

FOREIGN PATENT DOCUMENTS

| | | |
|---|---|---|
| DE | 10 2009 058 284 | 6/2011 |
| DE | 10 2011 053 500 | 3/2013 |
| DE | 10 2012 109 951 | 4/2014 |
| EP | 0 175 939 | 8/1985 |
| JP | H04-052954 U | 2/1999 |
| JP | 2005081882 A | 3/2005 |
| WO | 2013/186130 | 12/2013 |

\* cited by examiner

MOTOR VEHICLE HAVING A SUPERCHARGED INTERNAL COMBUSTION ENGINE WHICH IS ARRANGED AT THE REAR

CROSS REFERENCE TO RELATED APPLICATION

This application claims priority under 35 USC 119 to German Patent Appl. No. 10 2015 101 797.0 filed on Feb. 9, 2015, the entire disclosure of which is incorporated herein by reference.

BACKGROUND

1. Field of the Invention

The invention relates to a motor vehicle having a supercharged internal combustion engine arranged at the rear and can be fed cooled combustion air via a charge air cooler. The charge air cooler is positioned above the internal combustion engine and below a covering hood of the internal combustion engine.

2. Description of the Related Art

Modern so-called downsizing internal combustion engines that are fed combustion air via superchargers cannot be realized without efficient cooling of the charge air. A satisfactory degree of efficiency of a charge air cooler of this type is achieved only when its cooling area is of correspondingly large dimensions and as great a cooling air mass flow as possible can be fed to it. To this end, it is necessary to implement an incident flow with low pressure losses, air guidance with low pressure losses, and guidance of the output air out of the charge air cooler with low pressure losses. This is a challenge in structural terms, particularly when the internal combustion engine is arranged in the rear region of a motor vehicle.

DE 44 41 592 C2 discloses optimizing the air guidance at the rear of a motor vehicle by correspondingly configured side cheeks and ventilation grills on a spoiler unit.

DE 10 2009 058 284 A1 discloses controlling or blocking the feed of cooling air with the aid of the motor vehicle license plate in a vehicle with the internal combustion engine arranged in the front region.

DE 198 06 610 C2 discloses a motor vehicle with an internal combustion engine at the rear and a charge air cooler arranged within the rear spoiler immediately below a cooling air feed opening that is present on the top side of said rear spoiler. Thus, the charge air cooler is an integrated constituent part of the rear spoiler.

SUMMARY

The invention achieves a highly efficient and structurally simple arrangement for charge air guidance in a motor vehicle with an internal combustion engine at the rear.

According to the invention, the charge air cooler is positioned above the internal combustion engine and below a covering hood for the internal combustion engine. The charge air cooler can be fed via at least one charge air inlet opening in the charge air inlet shaft that adjoins the covering hood and can have air discharged via at least one charge air outlet shaft that is connected to outlet openings in the region of the license plate recess of the motor vehicle.

The charge air inlet shaft and the charge air inlet openings can advantageously extend substantially over the entire width of the covering hood.

The charge air cooler and the charge air inlet shaft and the charge air inlet openings may be arranged in the air flow region of a rear spoiler that is arranged on the covering hood. The charge air feed to the charge air cooler may be via an adjustable rear spoiler in a manner that is dependent on operating parameters of the internal combustion engine and/or the motor vehicle, for example on the driving speed.

To feed as great a cooling air mass flow as possible, the charge air inlet shaft may be configured to define a connection that is as short as possible and permits as great a cooling air flow as possible between the covering hood and the charge air cooler that is arranged on the top side of the internal combustion engine.

The charge air outlet openings may be integrated into the recess for the panel that supports a motor vehicle license plate so that an annular diffuser effect can be achieved to increase the charge air throughput via the license plate recess. The panels that support the license plates usually lie somewhat depressed within a recess with respect to the rear region of the motor vehicle. The recess can expediently be designed to receive the license plate panels in a protective manner and to bring about an annular diffuser effect in the rear flow region for discharging the air from the charge air cooler. The charge air outlet openings can be arranged in the lateral region of the license plate recess to reach partially around the panel that supports the license plate or around the license plate. The license plate recess itself can expediently be formed in the covering hood for the internal combustion engine, preferably directly below the rear spoiler or in the lower rear region of the motor vehicle.

Advantages, features and further details of the subject matter of the invention result from the appended drawing, in which one exemplary embodiment is shown diagrammatically. The features which are shown in the drawing and are mentioned in the description and in the claims can be essential to the invention in each case on their own and in any desired combination.

DETAILED DESCRIPTION

Figure 1:
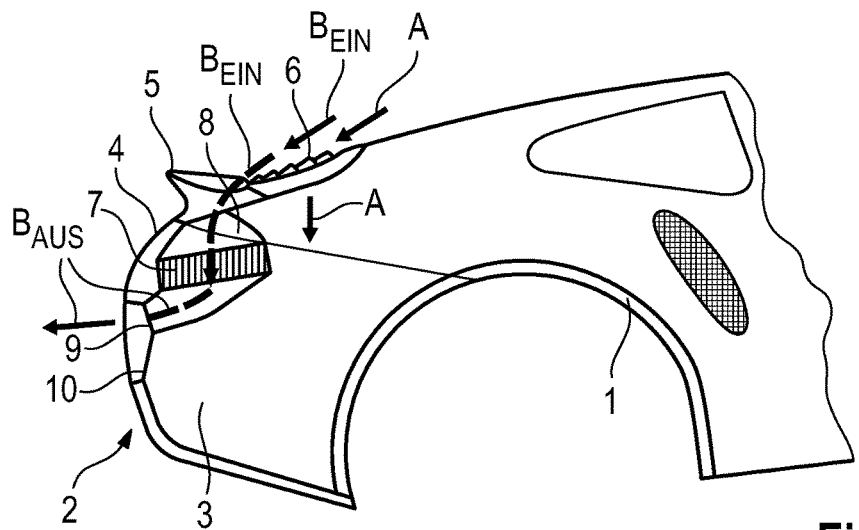
FIG. 1 shows a diagrammatic illustration of the subject matter of the invention.

FIG. 1 diagrammatically shows the rear region of a motor vehicle. The supercharged internal combustion engine (not shown) is positioned in the lower region 3 of the motor vehicle in the region of the wheel cutout 1 and the rear-side termination 2 of the motor vehicle. This space, in which the internal combustion engine is positioned, is usually accessible via a covering hood 4 that can be opened and closed. A rigid or adjustable rear spoiler 5 and cooling air inlet slats 6 are arranged substantially over the entire width of the rear region of the vehicle or over essential parts thereof for the inlet of cooling air into the space in which the internal combustion engine is positioned and can be arranged such that they are integrated into said covering hood 4.

According to the invention, a charge air cooler 7 is arranged above the internal combustion engine, and cooling air is fed to the charge air cooler 7 via a charge air inlet shaft 8 that extends substantially over the entire width of the covering hood 4. In accordance with the applicable regulations pursuant to the motor vehicle licensing act, a panel with the motor vehicle license plate is arranged in a depressed manner in the covering hood 4 or below the covering hood in the rear region 2 of the motor vehicle. Charge air outlet openings 10 are arranged (preferably laterally) in the license plate recess 9. The charge air outlet openings ideally are integrated into the license plate recess 9 in such a way that, acting as an annular diffuser, they can further increase the air throughput through the charge air cooler 7 and/or the air output in an efficient way.

The cooling air guidance to the space with the internal combustion engine is indicated by the arrows A. The air guidance to the charge air cooler 7 can be regulated by the spoiler 5, particularly if the spoiler 5 can be adjusted, for example, in a manner that is dependent on the driving speed, is indicated by $B_{EIN}$. The guidance of the air out of the outlet region of the charge air cooler 7 is indicated by $B_{AUS}$.

Figure 2:
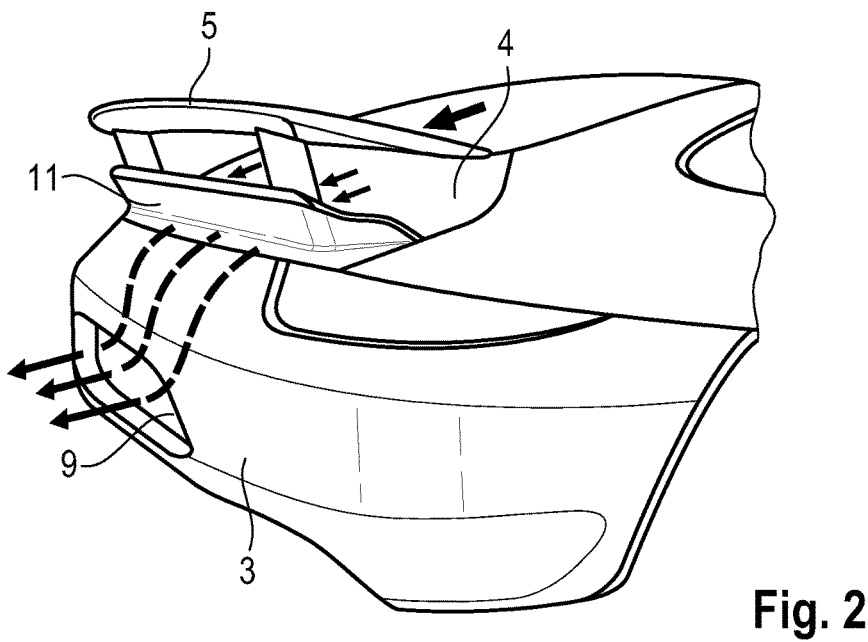
FIG. 2 shows the view of a rear region obliquely from the rear of a motor vehicle which is equipped with the subject matter of the invention and has an internal combustion engine at the rear.

FIG. 2 is a view of the rear region of a motor vehicle obliquely from behind and shows the arrangement of an adjustable rear spoiler 5 on a covering hood 4 and a rigid spoiler 11 that brings about the air feed to the charge air cooler 7. The air guidance in the charge air cooler 7 and through the charge air cooler 7 into the outlet region 10 in the license plate recess 9 in the lower rear region 3 of the motor vehicle is shown diagrammatically by way of the illustrated arrows.

Figure 3:
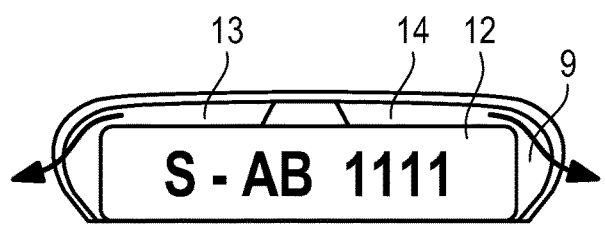
FIG. 3 shows details of the integration of the charge air outlet openings into a license plate recess in the covering hood of the internal combustion engine and in the rear region of a motor vehicle.

FIG. 3 shows the arrangement of a motor vehicle license plate 12 in a recess 9. The area for arranging the motor vehicle license plate 12 or the panel 12 that supports the motor vehicle license plate is surrounded in the upper region of the license plate recess 9 by outlet openings 13 and 14 of wide-area configuration, from which the air that is guided by the charge air cooler 7 is discharged (see arrows). The air outlet openings 13 and 14 ideally surround the license plate/the license plate panel 12 in the upper region of the license plate recess 9 to such an extent that the air output can take place for accelerated discharge and for a greater air throughput on account of a type of annular diffuser action.

It can be readily seen from the diagrammatic illustration in FIG. 1 that the arrangement of the charge air cooler 7 is extremely simple and very short. Thus, efficient air guidance via the rear region or via the spoiler 5 is achieved by way of the arrangement of the charge air cooler 7 above the internal combustion engine in the rear region of a motor vehicle so as to directly adjoin the contour profile of the covering hood 4. In addition, the relatively short configuration of the air guidance from the charge air cooler 7 to the air outlet openings 13 and 14 in the license plate recess 9 ensures a rapid air throughput. This arrangement and the installation of charge air coolers with a correspondingly great cooling area can be arranged over substantially the entire width of the covering hood 4 to the space for the internal combustion engine and to the charge air cooler 7 with extremely short and relatively voluminous air paths, thereby achieving effective cooling of the charge air and a high throughput.

LIST OF DESIGNATIONS

1 Wheel cutout
2 Rear-side termination
3 Lower region of the motor vehicle
4 Covering hood
5 Rear spoiler
6 Cooling air inlet slats
7 Charge air cooler
8 Charge air inlet shaft
9 License plate recess
10 Charge air outlet openings
11 Rigid spoiler
12 Motor vehicle license plate
13, 14 Air outlet openings
A Cooling air guidance, internal combustion engine compartment
$B_{EIN}$ Charge air guidance to the charge air cooler 7
$B_{AUS}$ Charge air outlet

What is claimed is:

1. A motor vehicle comprising: a supercharged internal combustion engine arranged at a rear end of the motor vehicle; and a charge air cooler for feeding cooled combustion air to the internal combustion engine, the charge air cooler being positioned above the internal combustion engine below a covering hood for the internal combustion engine, at least one charge air inlet opening in a charge air inlet shaft that adjoins the covering hood for feeding the charge air ($B_{EIN}$) and at least one charge air outlet shaft that is connected to outlet openings in a license plate recess of the motor vehicle for discharging the air ($B_{AUS}$) from the charge air cooler, the charge air inlet shaft and the charge air inlet openings being arranged in a rear-side air flow region of a rear spoiler that is arranged on the covering hood, and the charge air feed to the charge air cooler is controlled and set via an adjustable rear spoiler.

2. The motor vehicle of claim 1, wherein the charge air inlet shaft and the charge air inlet openings extend substantially over an entire width of the covering hood.

3. The motor vehicle of claim 1, wherein the charge air inlet shaft defines a connection between the covering hood and the internal combustion engine.

4. A motor vehicle, comprising: a supercharged internal combustion engine arranged at a rear end of the motor vehicle; and a charge air cooler for feeding cooled combustion air to the internal combustion engine, the charge air cooler being positioned above the internal combustion engine below a covering hood for the internal combustion engine, at least one charge air inlet opening in a charge air inlet shaft that adjoins the covering hood for feeding the charge air ($B_{EIN}$) and at least one charge air outlet shaft which is connected to outlet openings in a license plate recess of the motor vehicle for discharging the air ($B_{AUS}$) from the charge air cooler, wherein the charge air outlet openings are integrated into the license plate recess to create an annular diffuser effect that increases the charge air throughput.

5. The motor vehicle of claim 4, wherein the charge air outlet openings are arranged to reach partially around the motor vehicle license plate in the lateral region of the license plate recess.

6. The motor vehicle of claim 4, wherein the charge air inlet shaft and the charge air inlet openings extend substantially over an entire width of the covering hood.

7. The motor vehicle of claim 4, wherein the charge air inlet shaft and the charge air inlet openings are arranged in the rear-side air flow region of a rear spoiler that is arranged on the covering hood.

8. The motor vehicle of claim 7, wherein the charge air inlet shaft defines a connection between the covering hood and the internal combustion engine.

9. The motor vehicle of claim 7, wherein the charge air feed to the charge air cooler is controlled and set via an adjustable rear spoiler.

10. A motor vehicle, comprising: a supercharged internal combustion engine arranged at a rear end of the motor vehicle; and a charge air cooler for feeding cooled combustion air to the internal combustion engine, the charge air cooler being positioned above the internal combustion engine below a covering hood for the internal combustion engine, at least one charge air inlet opening in a charge air inlet shaft that adjoins the covering hood for feeding the charge air ($B_{EIN}$) and at least one charge air outlet shaft which is connected to outlet openings in a license plate recess of the motor vehicle for discharging the air ($B_{AUS}$) from the charge air cooler, wherein the license plate recess is formed in the covering hood for the internal combustion engine.

11. The motor vehicle of claim 10, wherein the charge air inlet shaft and the charge air inlet openings are arranged in the rear-side air flow region of a rear spoiler that is arranged on the covering hood.

12. The motor vehicle of claim 11, wherein the charge air feed to the charge air cooler is controlled and set via an adjustable rear spoiler.

13. The motor vehicle of claim 11, wherein the charge air inlet shaft defines a connection between the covering hood and the internal combustion engine.

14. The motor vehicle of claim 10 wherein the license plate recess is formed in a rear-side termination of the motor vehicle.

15. The motor vehicle of claim 10, wherein the charge air inlet shaft and the charge air inlet openings extend substantially over an entire width of the covering hood.

* * * * *